(12) United States Patent
Jakupca et al.

(10) Patent No.: US 11,674,041 B2
(45) Date of Patent: Jun. 13, 2023

(54) STABILIZER COMPOSITION FOR POLYMER-COMPOSITION MELT PROCESSING AND RELATED METHODS

(71) Applicant: Dover Chemical Corporation, Dover, OH (US)

(72) Inventors: Michael Jakupca, Canton, OH (US); Jacob Lance, New Philadelphia, OH (US)

( * ) Notice: Subject to any disclaimer, the term of this patent is extended or adjusted under 35 U.S.C. 154(b) by 18 days.

(21) Appl. No.: 17/334,327

(22) Filed: May 28, 2021

(65) Prior Publication Data

US 2022/0380600 A1 Dec. 1, 2022

(51) Int. Cl.
*C08L 85/02* (2006.01)
(52) U.S. Cl.
CPC .................... *C08L 85/02* (2013.01)
(58) Field of Classification Search
CPC ......... C08G 79/04; C08K 5/524; C08L 23/06; C08L 23/12; C08L 85/02
See application file for complete search history.

(56) References Cited

U.S. PATENT DOCUMENTS

2004/0183054 A1* 9/2004 Stevenson .............. C08K 5/524
252/400.24

2015/0203636 A1* 7/2015 Jakupca .................. C08L 23/12
558/87
2018/0186942 A1 7/2018 Waldie et al.

FOREIGN PATENT DOCUMENTS

CA 2989208 A1 6/2019

\* cited by examiner

*Primary Examiner* — Doris L Lee

(57) ABSTRACT

A composition having a polymer having a polymer matrix, a first stabilizer molecule within the polymer matrix, and a second stabilizer molecule within the polymer matrix, the first stabilizer molecule having the structure:

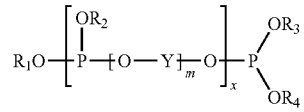

wherein each $R_1$-$R_4$ is independently selected from the group consisting of $C_{1-22}$ alkyl, $C_{6-40}$ cycloalkyl, $C_{2-20}$ alkyl glycol ether, and Y—OH; each Y is independently selected from the group consisting of $C_{2-40}$ alkylene, $C_{2-40}$ alkylene lactone, and $C_{6-40}$ cycloalkylene; m is an integer ranging from 1 to 100; and x is an integer ranging from 1 to 1,000; the second stabilizer molecule is a monophosphite having an aryl moiety; wherein the claimed composition does not include a hindered phenolic antioxidant, lactone stabilizer, or hydroxylamine stabilizer.

1 Claim, No Drawings

STABILIZER COMPOSITION FOR POLYMER-COMPOSITION MELT PROCESSING AND RELATED METHODS

CROSS-REFERENCE TO RELATED APPLICATIONS

None.

BACKGROUND OF THE INVENTION

Polymer-composition melt processing is well known and performed regularly throughout the world. There remains a need for stabilizer compositions that slow polymer degradation during melt processing.

BRIEF SUMMARY OF THE INVENTION

A composition having a polymer having a polymer matrix, a first stabilizer molecule within the polymer matrix, and a second stabilizer molecule within the polymer matrix, the first stabilizer molecule having the structure:

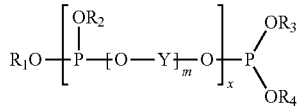

wherein each $R_1$-$R_4$ is independently selected from the group consisting of $C_{1-22}$ alkyl, $C_{6-40}$ cycloalkyl, $C_{2-20}$ alkyl glycol ether, and Y—OH; each Y is independently selected from the group consisting of $C_{2-40}$ alkylene, $C_{2-40}$ alkylene lactone, and $C_{6-40}$ cycloalkylene; in is an integer ranging from 1 to 100; and x is an integer ranging from 1 to 1,000; the second stabilizer molecule is a monophosphite having an aryl moiety; wherein the claimed composition does not include a hindered phenolic antioxidant, lactone stabilizer, or hydroxylamine stabilizer.

A composition having a polymer having a polymer matrix, a first stabilizer molecule within the polymer matrix, and a second stabilizer molecule within the polymer matrix, the first stabilizer molecule having the structure:

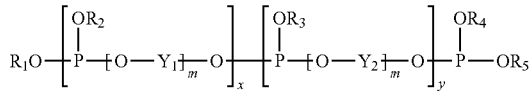

wherein each $R_1$-$R_5$ is independently selected from the group consisting of $C_{1-22}$ alkyl, $C_{6-40}$ cycloalkyl, $C_{1-20}$ alkyl glycol ethers, $Y_1$—OH, and $Y_2$—OH, wherein $Y_1$ and $Y_2$ are different; wherein each $Y_1$ and each $Y_2$ are independently selected from the group consisting of $C_{2-40}$ alkylene, $C_{2-40}$ alkylene lactone, and $C_{6-40}$ cycloalkylene; n is an integer selected from the range 1 to 100; m is an integer selected from the range 1 to 100; x is an integer ranging from 1 to 1,000; and y is an integer ranging from 1 to 1,000; the second stabilizer molecule is a monophosphite having an aryl moiety; wherein the claimed composition does not include hindered phenolic antioxidants, lactone stabilizers, and hydroxylamine stabilizers.

BRIEF DESCRIPTION OF THE SEVERAL VIEWS OF THE DRAWING

None.

DETAILED DESCRIPTION OF THE INVENTION

Embodiments are directed to a composition having:
1) a polymer having a polymer matrix,
2) a first stabilizer molecule within the polymer matrix, and
3) a second stabilizer molecule within the polymer matrix.

In the embodiments, the polymer can be any known polymer. Nonlimiting examples of useful polymers are: polycarbonate, polyamide, polyester, polystyrene, polyolefin, polypropylene, polyethylene, ethylene propylene copolymer, rubber, acrylonitrile butadiene styrene, butadiene rubber, polylactide, starch-based polymer, cellulose-based polymer, polyvinyl chloride, polyurethane, and combinations thereof.

In a first embodiment, the first molecule and the second molecule are as follows:
the first molecule has the structure:

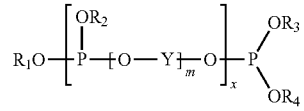

wherein
each $R_1$-$R_4$ is independently selected from the group consisting of $C_{1-22}$ alkyl, $C_{6-40}$ cycloalkyl, $C_{2-20}$ alkyl glycol ether, and Y—OH;
each Y is independently selected from the group consisting of $C_{2-40}$ alkylene, $C_{2-40}$ alkylene lactone, and $C_{6-40}$ cycloalkylene;
m is an integer ranging from 1 to 100; and
x is an integer ranging from 1 to 1,000;
and the second molecule is a monophosphite having an aryl moiety.

Within this first embodiment, v n ay be an integer ranging from 2 to 1000.

Within this first embodiment, the first molecule may have the more specific structure:

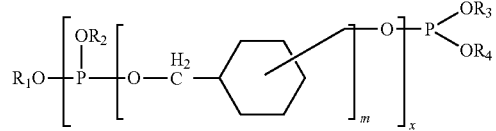

wherein
each $R_1$-$R_4$ is independently selected from the group consisting of $C_{1-22}$ alkyl, $C_{6-40}$ cycloalkyl, $C_{2-20}$ alkyl glycol ethers and Y—OH;
each Y is independently selected from the group consisting of $C_{2-40}$ alkylene, $C_{2-40}$ alkylene lactone, and $C_{6-40}$ cycloalkylene; and
m is an integer ranging from 1 to 100; and
x is an integer ranging from 1 to 1,000.

Within this first embodiment, in may be 1 in the immediately above more-specific structure of the first molecule.

Within this first embodiment, x may be an integer ranging from 2 to 1000 in the immediately above more-specific structure of the first molecule.

Within this first embodiment, the second-molecule monophosphite may have the following structure:

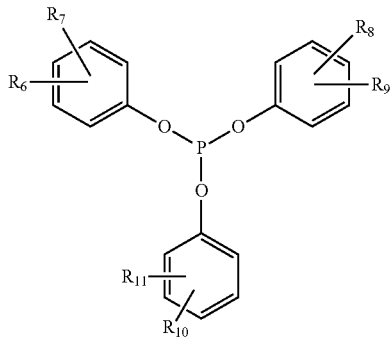

wherein each $R_6$-$R_{11}$ is independently selected from the group consisting of H, $C_1$-$C_{10}$ alkyl, $C_7$-$C_{15}$ alkyl aryl, and $C_7$-$C_{23}$ alkyl aryl. In a more specific example, within this first embodiment, the second-molecule monophosphite may have the following structure:

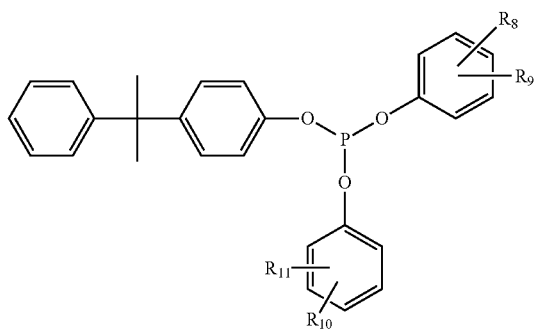

wherein each $R_8$-$R_{11}$ is independently selected from the group consisting of H, $C_1$-$C_{10}$ alkyl, $C_7$-$C_{15}$ alkyl aryl, and $C_7$-$C_{25}$ alkyl aryl. In another more specific example, within this first embodiment, the second-molecule monophosphite may have the following structure:

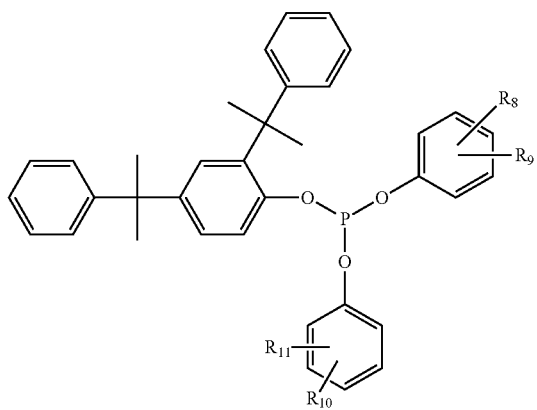

wherein each $R_7$-$R_{11}$ is independently selected from the group consisting of H, $C_1$-$C_{10}$ alkyl, $C_7$-$C_{15}$ alkyl aryl, and $C_7$-$C_{25}$ alkyl aryl. In still another more specific example, within this first embodiment, the second molecule may be:
  i. bis(2,4-di-tert-butyl-6-methylphenyl) ethyl phosphite, or
  ii. 2,2,2-nitrilo[tri-ethyltris(3,3 5,5-tetra-tert-butyl-1,1-biphenyl-2,2-diyl)]phosphite.

In this first embodiment, the composition not include a hindered phenolic antioxidant, lactone stabilizer, or hydroxylamine stabilizer.

In the first embodiment, the amount of the first molecule in the composition may range from 0.005 to 2.000 percent by weight of the total composition, and the amount of the second molecule in the composition may range from 0.005 to 2.000 percent by weight of the total composition. Alternatively, in the first embodiment, the amount of the first molecule in the composition may range from 0.005 to 1.000 percent by weight of the total composition, and the amount of the second molecule in the composition may range from 0.005 to 1.000 percent by weight of the total composition. Alternatively, in the first embodiment, the amount of the first molecule in the composition may be about 1 percent by weight of the total composition, and the amount of the second molecule in the composition may be about 1 percent by weight of the total composition.

The first embodiment may also have an acid neutralizer within the polymer matrix. Acid neutralizers may be divided into "inorganic"—such as zinc oxide, synthetic hydrotalcites and Li, Na, Ca or Al (hydroxy) carbonates; and "organic"—such as salts of fatty acids or their derivatives including calcium stearate, zinc stearate, calcium lactate and calcium stearoyl lactylate.

When employed, an acid neutralizer(s) is used in conventional amounts. In embodiments, a synthetic hydrotalcite is used in an amount ranging from 100 ppm to 1,000 ppm. In additional embodiments, zinc stearate is used in an amount ranging from 200 ppm to 700 ppm. In still other embodiments, calcium stearoyl lactylate is used in an amount ranging from 200 ppm to 700 ppm. In still other embodiments, a combination of a hydrotalcite with an "organic" acid neutralizer can be used in conventional amounts. Persons having ordinary skill in the art will also be able to determine a useful amount(s) without having to exercise undue experimentation.

The first embodiment may also have a hindered amine light stabilizer (HALS) within the polymer matrix. When employed, the HALS may be a commercially available material and may be used in a conventional manner and amount. Persons having ordinary skill in the art will also be able to determine a useful amount(s) without having to exercise undue experimentation. Commercially available HALS include those sold under the trademarks CHIMASSORB® 119; CHIMAS-SORB 944; CHIMASSORB 2020; TINUVIN® 622 and TINUVIN 770 from Ciba Specialty Chemicals Corporation, and CYASORB® UV 3346, CYASORB UV 3529, CYASORB UV 4801, and CYASORB UV 4802 from Cytec Industries. In some embodiments, TINUVIN 622 is preferred. Embodiments also include mixtures of more than one HALS.

Useful HALS include: bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis (1,2,2,6,6,-pentamethylpiperidyl)ester; condensation product of 1-hydroxyethyl-2,2,6,6-tetramethyl-4-hydroxy-piperidine and succinic acid; condensation product of N,N'-(2, 2,6,6-tetramethylpiperidyl)-hexamethylendiamine and 4-tert-octylamino-2,6-dichloro-1,3,5-s-triazine; tris-(2,2,6, 6-tetramethylpiperidyl)-nitrilotriacetate, tetrakis-(2,2,6,6-tetramethyl-4-piperidyl)-1,2,3,4 butane-tetra-carbonic acid; and 1,1'(1,2-ethanediyl)-bis-(3,3,5,5-tetramethylpiperazinone).

In a second embodiment, the first molecule and the second molecule are as follows:

the first molecule has the structure:

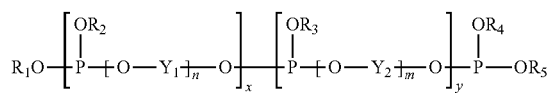

wherein each $R_1$-$R_5$ is independently selected from the group consisting of $C_{1-22}$ alkyl, $C_{6-40}$ cycloalkyl, $C_{1-20}$ alkyl glycol ethers, $Y_1$—OH, and $Y_2$—OH;

wherein $Y_1$ and $Y_2$ are different;

wherein each $Y_1$ and each $Y_2$ are independently selected from the group consisting of $C_{2-40}$ alkylene, $C_{2-40}$ alkylene lactone, and $C_{6-40}$ cycloalkylene;

n is an integer selected from the range 1 to 100;

m is an integer selected from the range 1 to 100;

x is an integer ranging from 1 to 1,000; and y is an integer ranging from 1 to 1,000;

and the second molecule is a monophosphite having an aryl moiety.

Within this second embodiment, x may be an integer ranging from 2 to 1000.

Within this second embodiment, the first molecule may have the more specific structure:

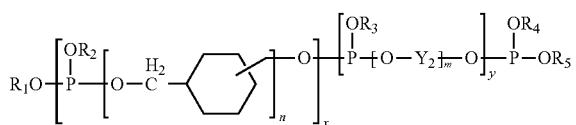

wherein each $R_1$-$R_5$ is independently selected from the group consisting of $C_{1-22}$ alkyl, $C_{6-40}$ cycloalkyl, $C_{1-20}$ alkyl glycol ethers, $Y_1$—OH, and $Y_2$—OH;

wherein $Y_1$ and $Y_2$ are different;

wherein each $Y_1$ and each $Y_2$ are independently selected from the group consisting of $C_{2-40}$ alkylene, $C_{2-40}$ alkylene lactone, and $C_{6-40}$ cycloalkylene;

n is an integer selected from the range 1 to 100;

m is an integer selected from the range 1 to 100;

x is an integer ranging from 1 to 1,000; and y is an integer ranging from 1 to 1,000.

Within this second embodiment, n may be 1 in the immediately above more-specific structure of the first molecule. Also within the second embodiment, m may be an integer selected from the range 2 to 100.

Within this second embodiment, x may be an integer ranging from 2 to 1000.

Within this second embodiment, the second-molecule monophosphite may have the following structure:

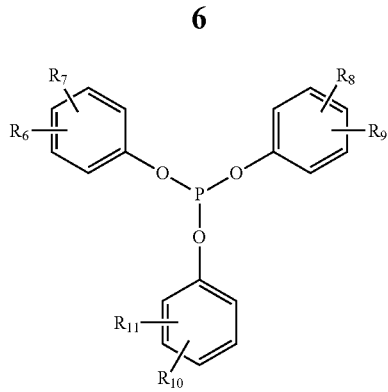

wherein each $R_6$-$R_{11}$ is independently selected from the group consisting of H, $C_1$-$C_{10}$ alkyl, $C_7$-$C_{15}$ alkyl aryl, and $C_7$-$C_{25}$ alkyl aryl. In a more specific example, within this second embodiment, the second-molecule monophosphite may have the following structure:

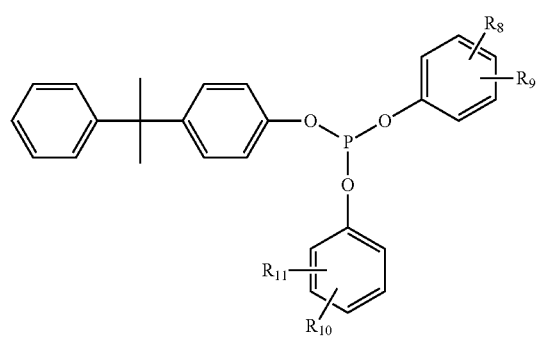

wherein each $R_8$-$R_{11}$ is independently selected from the group consisting of H, $C_1$-$C_{10}$ alkyl, $C_7$-$C_{15}$ alkyl aryl, and $C_7$-$C_{25}$ alkyl aryl. In another more specific example, within this second embodiment, the second-molecule monophosphite may have the following structure:

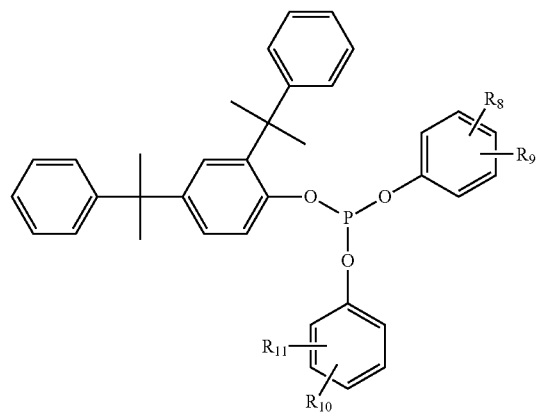

wherein each $R_7$-$R_{11}$ is independently selected from the group consisting of H, $C_1$-$C_{10}$ alkyl, $C_7$-$C_{15}$ alkyl aryl, and $C_{27}$-$C_{25}$ alkyl aryl. In still another more specific example, within this second embodiment, the second molecule may be:
  i. bis(2,4-di-tert-butyl-6-methylphenyl) ethyl phosphite, or
  ii. 2,2,2-nitrilo[tri-ethyltris(3,3 5,5-tetra-tert-butyl-1,1-biphenyl-2,2-diyl)]phosphite.

In this second embodiment, the composition may not include a hindered phenolic antioxidant, lactone stabilizer, or hydroxylamine stabilizer.

In this second embodiment, the amount of the first molecule in the composition ranges from 0.005 to 2.000 percent by weight of the total composition, and the amount of the second molecule in the composition ranges from 0.005 to 2.000 percent by weight of the total composition. Alternatively, in the first embodiment, the amount of the first molecule in the composition ranges from 0.005 to 1.000 percent by weight of the total composition, and the amount of the second molecule in the composition ranges from 0.005 to 1.000 percent by weight of the total composition. Alternatively, in the first embodiment, the amount of the first molecule in the composition is about 1 percent by weight of the total composition, and the amount of the second molecule in the composition is about 1 percent by weight of the total composition.

This second embodiment may also have an acid neutralizer within the polymer matrix. Acid neutralizers may be divided into "inorganic"—such as zinc oxide, synthetic hydrotalcites and Li, Na, Ca or Al (hydroxy) carbonates; and "organic"—such as salts of fatty acids or their derivatives including calcium stearate, zinc stearate, calcium lactate and calcium stearoyl lactylate.

When employed, an acid neutralize is used in conventional amounts. In embodiments, a synthetic hydrotalcite is used in an amount ranging from 100 ppm to 1,000 ppm. In additional embodiments, zinc stearate is used in an amount ranging from 200 ppm to 700 ppm. In still other embodiments, calcium stearoyl lactylate is used in an amount ranging from 200 ppm to 700 ppm. In still other embodiments, a combination of a hydrotalcite with an "organic" acid neutralizer can be used in conventional amounts. Persons having ordinary skill in the art will also be able to determine a useful mixings) without having to exercise undue experimentation.

This second embodiment may also have a hindered amine light stabilizer within the polymer matrix. When employed, the HALS may be a commercially available material and may be used in a conventional manner and amount. Persons having ordinary skill in the art will also be able to determine a useful amount(s) without having to exercise undue experimentation. Commercially available HALS include those sold under the trademarks CHIMASSORB® 119; CHIMAS-SORB 944; CHIMASSORB 2020; TINUVIN® 622 and TINUVIN 770 from Ciba Specialty Chemicals Corporation, and CYASORB® UV 3346, CYASORB UV 3529, CYASORB UV 4801, and CYASORB UV 4802 from Cytec Industries. In some embodiments, TINUVIN 622 is preferred. Embodiments also include mixtures of more than one HALS.

Useful HALS include: bis (2,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis (1,2,2,6,6,-pentamethylpiperidyl)ester, condensation product of 1-hydroxyethyl-2,2,6,6-tetramethyl-4-hydroxy-piperidine and succinic acid; condensation product of N,N-(2, 2,6,6-tetramethylpiperidyl)-hexamethylendiamine and 4-tert-octylamino-2,6-dichloro-1,3,5-s-triazine; tris-(2,2,6, 6-tetramethylpiperidyl)-nitrilotriacetate, tetrakis-(2,2,6,6-tetramethyl-4-piperidyl)-1,2,3,4 butane-tetra-carbonic acid; and 1,1'(1,2-ethanediyl)-bis-(3,3,5,5-tetramethylpiperazinone).

What is claimed is:
1. A composition comprising:
   a polymer having a polymer matrix, a first stabilizer molecule within the polymer matrix, and a second stabilizer molecule within the polymer matrix, the first stabilizer molecule having the structure:

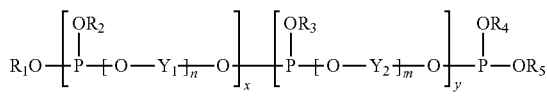

wherein
   each $R_1$-$R_5$ is independently selected from the group consisting of $C_{1-22}$ alkyl, $C_{6-40}$ cycloalkyl, $C_{1-20}$ alkyl glycol ethers, $Y_1$—OH, and $Y_2$—OH;
   wherein $Y_1$ and $Y_2$ are different;
   wherein each $Y_1$ and each $Y_2$ are independently selected from the group consisting of $C_{2-40}$ alkylene, $C_{2-40}$ alkylene lactone, and $C_{6-40}$ cycloalkylene;
   n is an integer selected from the range 1 to 100;
   m is an integer selected from the range 1 to 100;
   x is an integer ranging from 1 to 1,000; and
   y is an integer ranging from 1 to 1,000;
the second stabilizer molecule is a monophosphite having an aryl moiety;
wherein the claimed composition does not include hindered phenolic antioxidants, lactone stabilizers, and hydroxylamine stabilizers,
wherein the second stabilizer molecule has the structure:

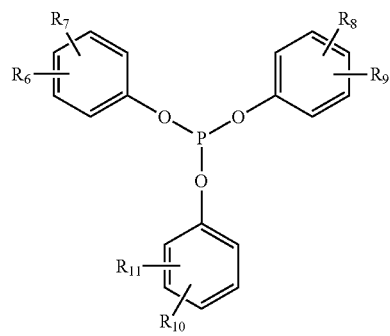

wherein each $R_6$-$R_{11}$ is independently selected from the group consisting of H, $C_1$-$C_{10}$ alkyl, $C_7$-$C_{15}$ alkyl aryl, and $C_7$-$C_{25}$ alkyl aryl, and
wherein the second stabilizer molecule has the structure:

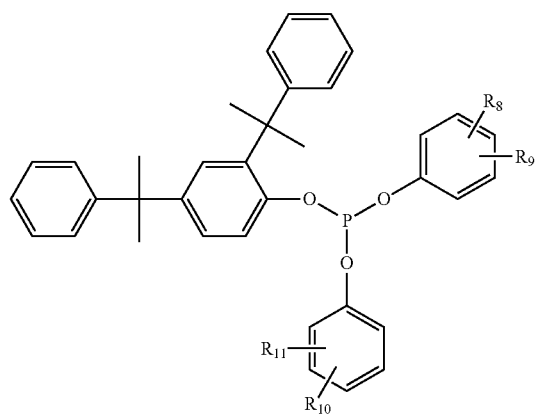

wherein each $R_7$-$R_{11}$ is independently selected from the group consisting of H, $C_1$-$C_{10}$ alkyl, $C_7$-$C_{15}$ alkyl aryl, and $C_7$-$C_{25}$ alkyl aryl.

* * * * *